D. ELDRED.
Broadcast-Seeder.
No. 28,357.  Patented May 22, 1860.
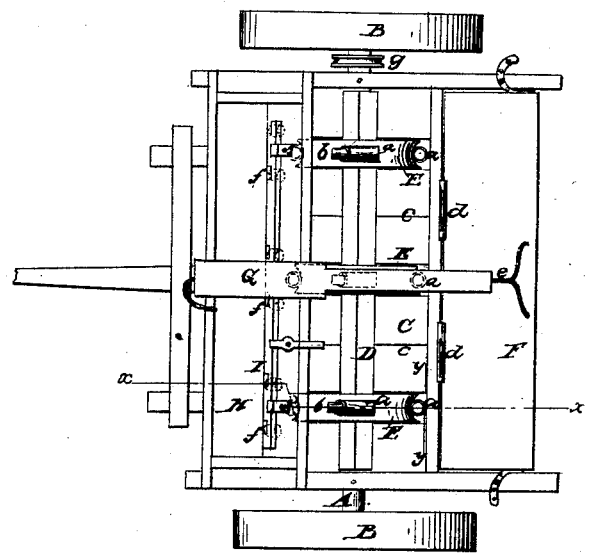
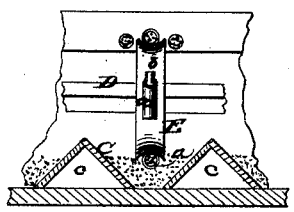
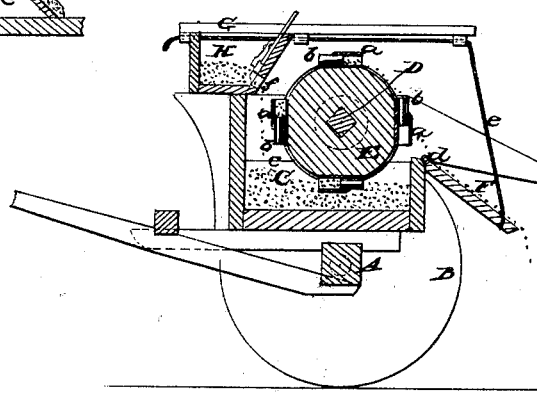
Inventor.
David Eldred
by
Munn & Co.
Attorneys

UNITED STATES PATENT OFFICE.

DAVID ELDRED, OF MONMOUTH, ILLINOIS.

IMPROVEMENT IN SEEDING-MACHINES.

Specification forming part of Letters Patent No. 28,357, dated May 22, 1860.

*To all whom it may concern:*

Be it known that I, DAVID ELDRED, of Monmouth, in the county of Warren and State of Illinois, have invented a new and Improved Seeding-Machine; and I do hereby declare that the following is a full, clear, and exact description of the same, reference being had to the annexed drawings, making a part of this specification, in which—

Figure 1 is a plan or top view of my invention; Fig. 2, a side sectional view of the same, taken in the line $x\ x$, Fig. 1; Fig. 3, an enlarged section of a portion of the seed-box, taken in the line $y\ y$, Fig. 1.

Similar letters of reference indicate corresponding parts in the several figures.

This invention relates to an improved seeding-machine of that class which are used for sowing seed broadcast; and it consists in a novel means for varying the capacity of the seed-receptacles, and consequently for regulating the amount of seed to be sown in a given area.

The invention also consists in the employment or use of an adjustable scattering-board attached to the seed-box, and so arranged relatively therewith that the distribution of the seed may be stopped whenever desired without throwing the working parts of the distributing device out of gear with the driving-wheel.

The invention further consists in a means employed for retaining the seed in proper position within the seed-box, so that the distribution of the seed will not be effected by the inclination of the machine in moving over inclined ground.

To enable those skilled in the art to fully understand and construct my invention, I will proceed to describe it.

A represents an axle having a wheel, B, at each end and a draft-pole secured to it.

C is a seed-box, which is attached to the axle A and has a shaft, D, placed longitudinally on its upper part, and provided with a series of wheels, E, placed at equal distances apart.

To the peripheries of the wheels E there are attached circumferentially a series of tubes, $a$. These tubes may be of sheet metal, and each has a stopper, $b$, fitted in one end, which may be of cork or other suitable elastic substance. The stoppers $b$ serve as bottoms to the tubes $a$, and the capacity of these tubes may be varied by adjusting the corks a greater or less distance into the tubes $a$. This will be fully understood by referring to Fig. 2.

To the bottom of the box C there are a series of double-inclined partitions, $c$. These partitions are placed between the wheels E, one in each space, the wheel E being directly over the centers of the spaces between the partitions $c$. (See Fig. 3.)

To the back edge of the seed-box C there is attached by hinges or joints $d$ a board, F. This board extends the whole length of the seed-box, and it has a cord, $e$, attached to it, the cord extending through proper guides to the driver's seat G, as shown clearly in Fig. 2.

To the upper part of the seed-box C, at its front side, there is secured a seed-hopper, H, the back part of which is provided with holes $f$, over which a recessed or notched slide, I, is fitted and allowed to work freely back and forth to form a register to control the escape of seed into the seed-box C. On the hopper H the seat J is placed, and the shaft D is driven from the axle A by a belt, $g$.

The operation is as follows: As the machine is drawn along and the wheels E rotate the tubes or seed-receptacles $a$ scoop up the seed from the seed-box C and discharge it upon the inclined board F, which serves as a scatterer, the seed falling from the board F upon the ground. The capacity of the tubes $a$ may be regulated by adjusting the stoppers $b$, and when it is not designed to distribute any seed the board F is elevated, the driver drawing in the cord $e$. In case the machine is passing over inclined ground the partitions $c$ keep the seed underneath the several wheels E, preventing its passing down by gravity toward the lower end of the seed-box.

The stoppers $b$ may be of cork, india-rubber, or other suitable elastic or yielding substance.

Having thus described my invention, what I claim as new, and desire to secure by Letters Patent, is—

1. The employment or use of the tubes or seed-receptacles $a$, when attached to the peripheries of wheels E and provided with adjustable yielding or elastic stoppers $b$, arranged as and for the purpose set forth.

2. The adjustable or hinged scattering-board F, attached to the seed-box C, as and for the purpose specified.

3. The double inclined partitions $c\ c$ in the seed-box C, arranged relatively with the seed-distributing wheels E, for the purpose set forth.

DAVID ELDRED.

Witnesses:
W. B. GREER,
WM. LAFERTY.